UNITED STATES PATENT OFFICE.

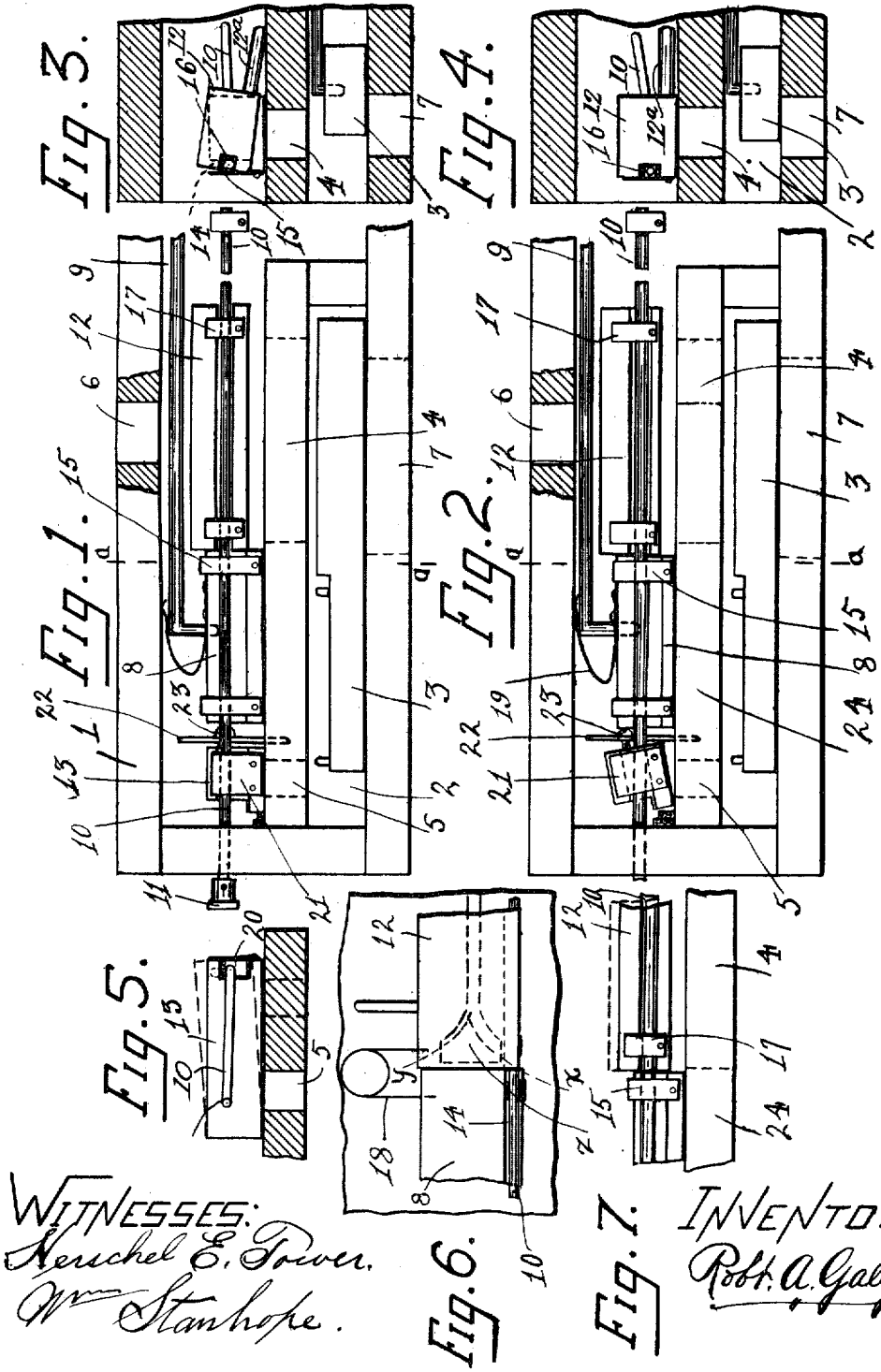

ROBERT A. GALLY, OF CINCINNATI, OHIO, ASSIGNOR TO THE BALDWIN COMPANY, OF CINCINNATI, OHIO.

VALVE WITH DOUBLE THROW.

1,274,031.  Specification of Letters Patent.  Patented July 30, 1918.

Application filed October 8, 1917. Serial No. 195,398.

*To all whom it may concern:*

Be it known that I, ROBERT A. GALLY, a citizen of the United States, and residing at Cincinnati, in the county of Hamilton and State of Ohio, have invented certain new and useful Improvements in Valves with Double Throw, of which the following is a specification.

In the prior art a valve has had two motions in the same plane as in the patent to applicant #1,101,919, June 30, 1914, Figures 6 and 6ª, and its specification page 6, column 2, paragraph 2; but the present invention is the first device to use a valve seated over a port in a plane surface and having two directions or manners of motion to and from the said surface and port.

In the drawings Fig. 1 is a front view of the new valve action as applied to the so called tempo-governor box of a music player, the tempo valve being next to the fullest degree of opening, and the special valve seated; Fig. 2 is a similar view with the tempo valve fully open and the special valve tipped by the thrust of the tempo valve; Figs. 3 and 4 are sections at a—a viewed from the right end, showing the normal and depressed conditions of the trailer valve and the accelerator valve removed to allow view of the left arm of the rocker wire; Fig. 5 is a view of the accelerator valve seated, the dotted lines indicating the same valve when in its raised position; Fig. 6 a plan view of the tempo and trailer valves at the full open position of the tempo valve as in Fig. 2; and Fig. 7 is a front view of the same valves as in Fig. 2, repeated for convenience of comparison with plan view of Fig. 6, and having dotted lines showing its raised position when the trailer valve is elevated by the rocker wire.

The present improvement of two directions or manners of motion of a valve from its seat is now illustrated as applied to a tempo governor box of the style shown in this applicant's Patent #1,101,626, June 30, 1914, simply as one employment of the present invention, but it is to be understoood that the present invention is applicable to any purpose where a double control of a valve is desired, and that the broader claims herein are intended to cover any application of the novel valve motion herein set forth.

The particular features of the tempo-governor box 1 with which the present invention is illustrated will now be first described, following which the special novel operation of the valve motion will be particularized as exemplified by the accelerator valve 13 of the said tempo-governor-box.

The tempo box 1 shows a governor chamber 2 having a governor valve 3 for effecting an even tension air supply to the tempo ports 4 and 5.

The governor pneumatic and spring and other customary parts of a tension governing device are not shown, but are understood to be provided in any suitable manner, and might be at a distant point, and so also might the governor valve and chamber. The present invention relates to the quantity control of air for determining the speed of a wind motor which propels the music spools and sheet of a self-playing musical instrument, which motor may be connected by conducting means attached to port 6 of the box 1.

The port 7 is understood to be connected to the air tension producing means, which is usually of varying tension. If of even tension, the connection might be direct from such air tension producing means to the tempo port 4.

A tempo valve 8 has its position above tempo port 4, and is movable from its closed position over said port to an open position as in Figs. 1 and 2. Such motion is effected by a valve wire 9 suitably connected to any manual control means.

A rocker 10 is of a bail form hung on centers at rear of its end arms, and is connected by an arm 11 to any suitable manual control means adapted for effecting a secondary or modifying control of tempo. To this rocker 10 are connected a trailer valve 12 and an accelerator valve 13, and the tempo valve 8 may also be guided thereby. The guidance of the tempo-valve 8 on rocker 10 is here shown as by the valve 8 having a recess or groove 14 lengthwise thereof, the front of said recess being closed by guards or clips 15. This groove 14 is of sufficient height to permit the rise of rocker 10 when lifting trailer valve 12 and accelerator valve 13 and at the same time retain the valve 8 in guidance on said rocker 10 the bottom of said groove 14 being sufficiently below the rocker 10 at normal position to allow the depression of the rocker when lowering trailer valve 12 below normal as shown in Fig. 4. The trailer valve 12 is guided on rocker 10 by a groove 16 in the front of the valve 12 the front of the groove being closed by guards or clips 17 and the height of the groove neatly fitting rocker 10 so that the trailer valve 12 will always travel with said rocker 10. The trailer valve 12 is normally above the seat in which is the tempo port 4, as in Figs. 1, 2 and 3, the arm 12ª extended from trailer valve 12 then keeping the rear edge of that valve 12 above the seat, and this trailer valve 12 is held against the right end of the tempo valve 8 by means of a spring 18 engaging both valves and pulling them together yet allowing an up and down motion of the trailer valve 12 and raising of the accelerator valve 13 by operation of the rocker 10 without disturbing the seating of the tempo valve 8, which is aided to its seat by a spring 19. When the valve 8 is moved by wire 9 and its manual control so as to open tempo port 4 as in Figs. 1 and 2, the downward operation of the rocker 10 swung on its centers by arm 11 and its manual control as in Fig. 4 will partly or wholly close whatever of tempo port 4 has been opened by tempo valve 8 and its controlling connections, thus slowing or entirely stopping the motor from the speed set by the manual control of tempo valve 8.

The accelerator-valve 13 is guided at its front on rocker 10 by a groove 20 in the front of valve 13, the front of the groove 20 being closed by a guard or clip 21, as shown in Figs. 1, 2 and 5, the top of said groove 20 being closely adjacent rocker 10 when latter is in normal position, and the bottom of said groove 20 being sufficiently below said rocker 10 when in normal position to allow the depression of the rocker when lowering trailer-valve 12. The one side of the accelerator valve 13 is guided against the arm of the rocker 10 at left of said valve 13, and at the other side of said valve 13 by a guide-pin 22 driven into a solid part of the box. The accelerator valve 13 lies normally closed over the accelerator port 5, but an upward operation of rocker 10 by arm 11 and its manual control will raise this accelerator valve 13, as shown by dotted lines in Fig. 5, and allow air to flow through its port 5 to actuate the motor, either by port 5 alone if tempo valve 8 is closed over port 4, or to increase the motor speed set by the tempo valve 8 if that is already open. In the latter case, the raising of the trailer valve 12 above its normal distance above port 4, as shown by dotted lines of Fig. 7, will free that port 4 of some of the air friction caused by its position over that port 4 and by that means also add to the speed of the motor.

The accelerator port 5 is placed well to the rear of the accelerator valve 13, the same as shown in applicant's prior Patent #1,101,626, so that the raising of its front end by rocker 10 is greatly reduced in its amount of motion over port 5, thus enabling a very gradual and accurate control of the speed increase by this means.

The valve 13 has a screw or other suitable means 23 adapted to be contacted by the tempo valve 8 just before the said valve 8 reaches its fully open position as in Fig. 2, but to be clear of contact with said valve 8 when said valve 8 is at a less degree of opening as in Fig. 1. The said contact of the tempo valve 8 with the accelerator valve 13 causes the valve 13 to be tipped over and thus open the entire long edge of its right side away from the seat 24 in which its related port 5 is located, thus causing a more free opening of the port 5 at such time than when the valve 13 is raised from its front end by the rocker 10 as herein before described. This sidewise raising of the valve 13 by the final part of the opening travel of the tempo valve 8 secures an added service of air which the said final part of the opening travel of the tempo valve 8 will not accomplish because of the obstruction by the trailer valve 12 of the air flow of the end of the port 4 last opened by the opening travel of the tempo valve 8, but which is hooded over by the trailer valve 12 as will be seen from a study of these parts as shown in Fig. 1, assisted by the plan view Fig. 6, and the related front view detail Fig. 7.

It will be seen that there is only a small height of opening under the front of the trailer valve 12, and still less under the rear edge. The amount of air that can pass under these two edges to the port 4 is expressed by the curved lines X and Y in Fig. 6, the distance between line X and the front edge of the port 4 showing the amount of air flow under the front edge of the valve 8, and the distance between the line y and the rear edge of the port 4 showing the amount of air flow under the rear edge of valve 8, there being a dead part Z of the port 4, which is at the final part of the opening movement of the valve 8 when the requirement for the usual wind motor is for a greater increase of air flow than for any other similar extent of movement of the valve 8 over port 4. The previously described side tipping action of the accelerator valve 13 at the final opening movement of the tempo valve 8 over port 4 overcomes this lack of supply which has heretofore been a drawback in the perfect grading of the speed of a tempo valve having a trailer as shown in the prior Patent, #1,101,626 and now improved as set forth herein.

What I claim as my invention is:—

1. A seat having a port therein, a valve normally resting on the said seat over the said port, and means adapted to raise the said valve from the said seat and port in one direction at one time, and to raise the said valve from the said seat and port in another direction at another time.

2. A seat having a port therein, a valve normally resting on the said seat over the said port; a means adapted to raise the said valve from the said seat and port in one direction at one time; and another means adapted to raise the said valve from the said seat and port in another direction at another time.

3. A seat having a port therein, a valve normally resting on the said seat over the said port, and means adapted to raise the said valve from the said seat and port, in one manner at one time, and to raise the said valve from its seat in another manner at another time.

4. A seat having a port therein, a valve normally resting on the said seat over the said port; a means adapted to raise the said valve from the said seat and port, in one manner at one time and another means adapted to raise the said valve from the said seat and port, in another manner at another time.

5. A seat having a port therein a valve normally resting on the said seat over the said port, and means adapted to move the said valve away, from the said seat and port in different manners, the valve having a certain edge as its axis during one of the said manners of movement, and having another edge as its axis during another of its said manners of movement.

6. A seat having a port therein, a valve normally resting on the said seat over the said port, and means adapted to move the said valve away, from the said seat and port in two different manners, the valve having a certain edge as its axis during one of the said manners of movement, and having another edge as its axis during another of its said manners of movement.

7. A flat seat having a port therein; a rectangular valve normally resting on the said seat over the said port and means adapted to move the said valve away, from the said seat and port in different manners, the valve having a certain edge as its axis during one of the said manners of movement, and having another edge as its axis during another of its said manners of movement.

8. A flat seat having a port therein; a rectangular valve normally resting on the said seat over the said port and means adapted to move the said valve away, from the said seat and port in two different manners, the valve having a certain edge as its axis during one of the said manners of movement, and having another edge as its axis during another of its said manners of movement.

9. A seat having a port therein and a valve having two ends and two sides and normally resting on the said seat and over the said port and means adapted to move only one of the two ends of the said valve away from the said seat and port at one time and to move only one of the two sides of the said valve away from the said seat and port at another time.

10. A seat having a port therein and a valve having two ends and two sides and normally resting on the said seat and over the said port and means adapted to move only one of the two ends of the said valve away from the said seat and port at one time and to move only one of the two sides of the said valve away from the said seat and port at another time; the said port being situated near the end of the said valve that is not raised by the first stated movement.

11. A seat having a port therein and a valve having two ends and two sides and normally resting on the said seat and over the said port and means adapted to move only one of the two ends of the said valve away from the said seat and port at one time and to move only one of the two sides of the said valve away from the said seat and port at another time; the said port being situated near the end of the said valve that is not raised by the first stated movement; and nearer to the said edge that is raised than to the said end that is raised.

12. A seat having two ports therein; a slidable valve adapted to slide over and regulate to various degrees the opening of one of the two said ports, an auxiliary valve movable with the said slidable valve over the port controlled by the slidable valve, the said auxiliary valve being normally over but clear of the port controlled by the said slidable valve; a second valve normally seated over the other said port, and means adapted to slide the said slidable valve and to open the said second valve when the said slidable valve is at a position of great opening of the said port which it controls.

13. A seat having two ports therein; a slidable valve adapted to slide over and regulate to various degrees the opening of one of the two said ports, an auxiliary valve movable with the said slidable valve over the port controlled by the slidable valve, the said auxiliary valve being normally over but clear of the port controlled by the said slidable valve; a second valve normally seated over the other said port, and means adapted to slide the said slidable valve and to open the said second valve when the said slidable valve is at a position of great opening of the said port which it controls; and means adapted to open the said second valve without moving the said slidable valve.

14. A seat having two ports therein; a slidable valve adapted to slide over and regulate to various degrees the opening of one of the two said ports, an auxiliary valve movabe with the said slidable valve over the port controlled by the slidable valve, the said auxiliary valve being normally over but clear of the port controlled by the said slidable valve; a second valve normally seated over the other said port, and means adapted to slide the said slidable valve and to open the said second valve when the said slidable valve is at a position of great opening of the said port which it controls; and means adapted to open the said second valve without moving the said slidable valve; the two said movements of the said second valve being of different manner one to the other.

15. A seat having two ports therein; a slidable valve adapted to slide over and regulate to various degrees the opening of one of the two said ports, an auxiliary valve movable with the said slidable valve over the port controlled by the slidable valve, the said auxiliary valve being normally over but clear of the port controlled by the said slidable valve; a second valve normally seated over the other said port, and means adapted to slide the said slidable valve and to open the said second valve when the said slidable valve is at a position of great opening of the said port which it controls; and means adapted to open the said second valve without moving the said slidable valve; the two said movements of the said second valve being of different directions one to the other.

16. A seat having two ports therein; a slidable valve adapted to slide over and regulate to various degrees the opening of one of the two said ports, an auxiliary valve movable with the said slidable valve over the port controlled by the slidable valve, the said auxiliary valve being normally over but clear of the port controlled by the said slidable valve; a second valve normally seated over the other said port, and means adapted to slide the said slidable valve and to open the said second valve when the said slidable valve is at a position of great opening of the said port which it controls; and means adapted to open the said second valve without moving the said slidable valve; the two said movements of the said second valve being of different degrees of opening of the said port controlled by the said second valve.

17. A seat having two ports therein; a slidable valve adapted to slide over and regulate to various degrees the opening of one of the two said ports, an auxiliary valve movable with the said slidable valve over the port controlled by the slidable valve, the said auxiliary valve being normally over but clear of the port controlled by the said slidable valve; a second valve normally seated over the other said port, and means adapted to slide the said slidable valve and to open the said second valve when the said slidable valve is at a position of great opening of the said port which it controls; and additional means adapted to at one time move the said auxiliary valve toward the port over which it travels with the slidable valve and at another time to open the said second valve from its port.

18. A seat having two ports therein; a slidable valve adapted to slide over and regulate to various degrees the opening of one of the two said ports; a second valve normally seated over the other said port, and means adapted to slide the said slidable valve and to open the said second valve when the said slidable valve is at a position of great opening of the said port which it controls.

19. A seat having two ports therein; a slidable valve adapted to slide over and regulate to various degrees the opening of one of the two said ports; a second valve normally seated over the other said port, and means adapted to slide the said slidable valve and to open the said second valve when the said slidable valve is at a position of great opening of the said port which it controls, and means adapted to open the said second valve without moving the said slidable valve.

20. A seat having two ports therein; a slidable valve adapted to slide over and regulate to various degrees the opening of one of the two said ports; a second valve normally seated over the other said port, and means adapted to slide the said slidable valve and to open the said second valve when the said slidable valve is at a position of great opening of the said port which it controls; and means adapted to open the said second valve without moving the said slidable valve; the two said movements of the said second valve being of different manner one to the other.

21. A seat having two ports therein; a slidable valve adapted to slide over and regulate to various degrees the opening of one of the two said ports; a second valve normally seated over the other said port, and means adapted to slide the said slidable valve and to open the said second valve when the said slidable valve is at a position of great opening of the said port which it controls; and means adapted to open the said second valve without moving the said slidable valve; the two said movements of the said second valve being of different directions one to the other.

22. A seat having two ports therein; a slidable valve adapted to slide over and regulate to various degrees the opening of one of the two said ports; a second valve normally seated over the other said port, and means adapted to slide the said slidable valve and to open the said second valve when the said slidable valve is at a position of great opening of the said port which it controls; and means adapted to open the said second valve without moving the said slidable valve; the two said movements of the said second valve being of different degrees of opening of the said port controlled by the said second valve.

23. A seat having two ports therein; a slidable valve adapted to slide over and regulate to various degrees the opening of one of the two said ports; an auxiliary valve movable with the said slidable valve over the port controlled by the slidable valve, the said auxiliary valve being normally over but clear of the port controlled by the said slidable valve; a second valve normally seated over the other said port, and means adapted to slide the said slidable valve and to open the said second valve when the said slidable valve is at a position of great opening of the said port which it controls; and additional means adapted to at one time move the said auxiliary valve away from the port over which it travels with the slidable valve and at the same time to open the said second valve from its port.

ROBT. A. GALLY.

Witnesses:
PAUL J. HENGGE,
NORMA KEISER.

Copies of this patent may be obtained for five cents each, by addressing the "Commissioner of Patents, Washington, D. C."